United States Patent [19]
Fisch

[11] Patent Number: 5,511,709
[45] Date of Patent: Apr. 30, 1996

[54] ROOF RACK FOR MOTOR VEHICLES

[75] Inventor: Fritz Fisch, Wuppertal, Germany

[73] Assignee: Happich Fahrzeug-Dachsysteme GmbH, Germany

[21] Appl. No.: 266,432

[22] Filed: Jun. 27, 1994

[30] Foreign Application Priority Data

Jun. 29, 1993 [DE] Germany ............ 43 21 535.1

[51] Int. Cl.⁶ .................. B60R 9/045; B60R 9/05
[52] U.S. Cl. ................ 224/321; 224/326; 224/316
[58] Field of Search ................ 224/309, 316, 224/320, 321, 325, 326, 327, 310, 314, 315

[56] References Cited

U.S. PATENT DOCUMENTS

| | | | |
|---|---|---|---|
| 4,416,406 | 11/1983 | Popeney | 224/314 |
| 5,340,007 | 8/1994 | Jeuffray et al. | 224/320 |
| 5,377,890 | 1/1995 | Brunner et al. | 224/309 |
| 5,395,024 | 3/1995 | Luchtenberg | 224/309 |

FOREIGN PATENT DOCUMENTS

| | | |
|---|---|---|
| 0211297 | 7/1986 | European Pat. Off. . |
| 2661378 | 4/1990 | France . |
| 2699475 | 6/1994 | France ............ 224/309 |
| 3719974 | 12/1987 | Germany . |
| 3700885 | 3/1988 | Germany . |
| 3641745 | 6/1988 | Germany . |
| 8809404 | 7/1988 | Germany . |
| 3814799 | 11/1988 | Germany . |
| 3826662 | 2/1990 | Germany . |
| 4018009 | 12/1991 | Germany . |
| 9108929 | 6/1991 | WIPO . |

*Primary Examiner*—Linda J. Sholl
*Attorney, Agent, or Firm*—Ostrolenk, Faber, Gerb & Soffen

[57] ABSTRACT

A roof rack for a motor vehicle including two roof strips which extend longitudinally along the roof, are parallel to each other and are spaced apart. A respective support strip on each roof strip is swingable from a position in a recess on the roof strip to a position across to the other roof strip. Each support strip is swingable about a mount at a respective vertical axis. The mount includes a set screw settable to determine the amount to which the support strip may be upraised from the vehicle roof and a spring which urges the support strip upward, establishing thereby the upper and lower positions of the support strip with respect to the vehicle roof. The support strip may be locked in the lowered or upraised vertical positions.

13 Claims, 6 Drawing Sheets

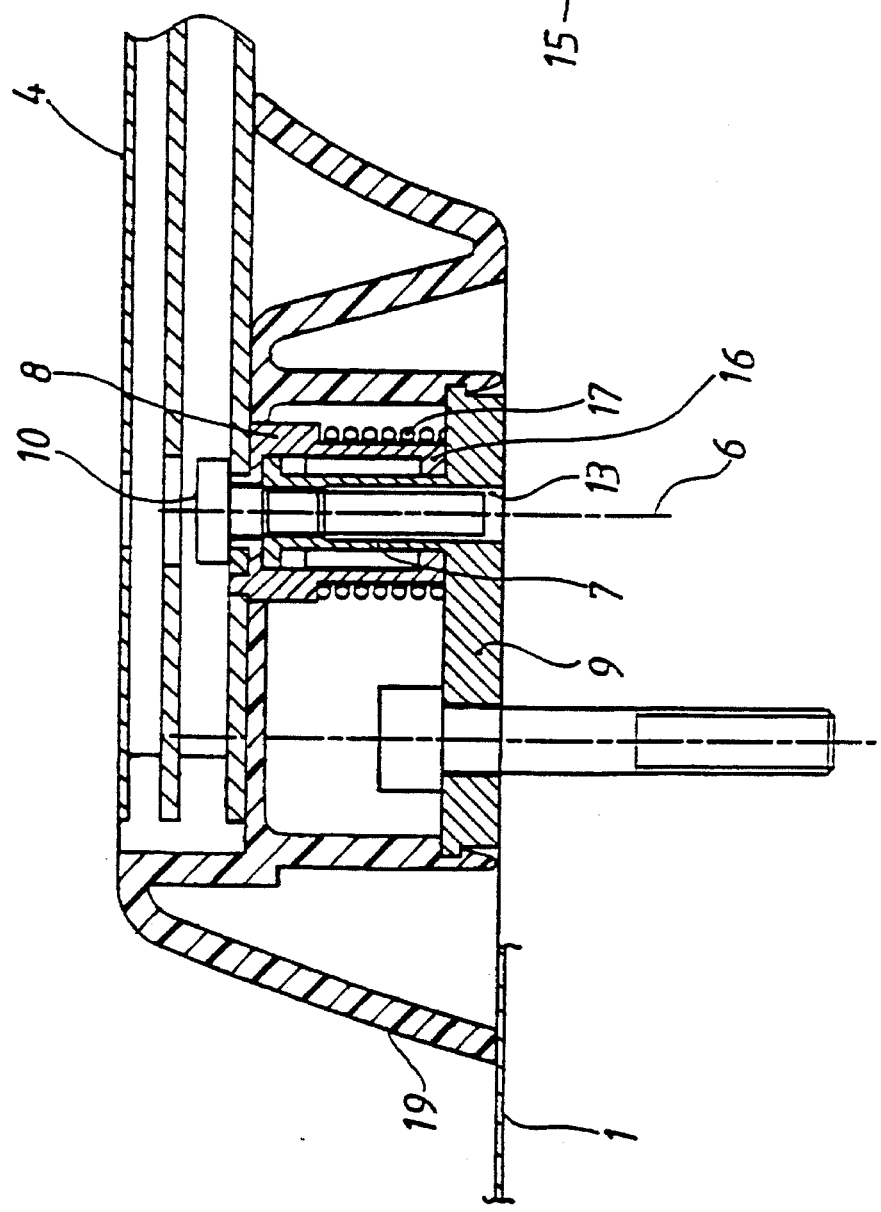
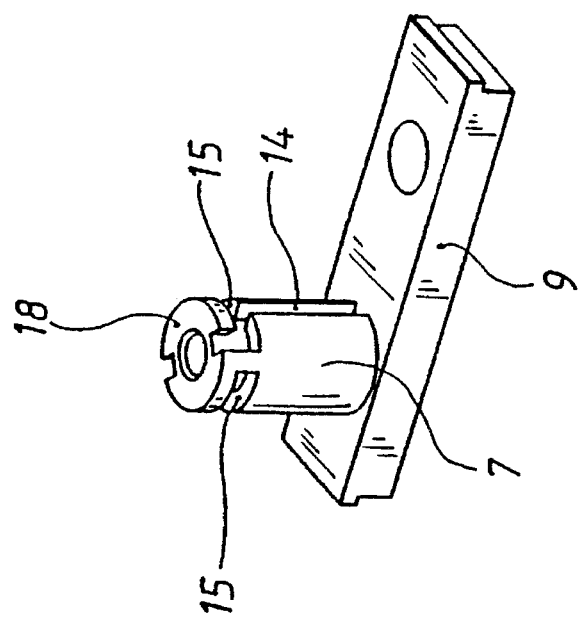
Fig. 4
Fig. 5

ROOF RACK FOR MOTOR VEHICLES

BACKGROUND OF THE INVENTION

The present invention relates to a roof rack for motor vehicles having two roof strips extending along the roof and a respective support strip on each roof strip including the support strip from one roof strip or each roof strip being extendable to the other roof strip. Each support strip is swingable around a vertical axis from a first position in which it extends at least approximately parallel to the respective roof strip and along the respective side edge of the roof, into a second position, in which the support strip extends transversely over the roof to the other roof strip. The support strip can be locked in either selected position.

Federal Republic of Germany 36 41 745 C2 describes a roof rack in the form of rails which extend parallel to each other along the longitudinal direction of the roof of a passenger car. Each rail consists of at least one longitudinal spar and the rail is firmly attached to the roof at least two points by feet on the rail. The longitudinal spars of each rail are swingable with the foot points in bearings around a vertical axis and the spars can be engaged and locked in detent points of the opposite rails which are associated with the foot points.

A similar arrangement for a vehicle body is shown in Federal Republic of Germany 38 14 799 C2. It includes a roof rack which consists of two spars which extend at least approximately parallel to each other and substantially in the direction of travel. The rails are formed by the spars and by individual support bars which are arranged between the spars. The support bars can be removed from their position of use when the roof rack is not in use. The spars have chambers to receive the support bars when they are not required.

In both of the above cases, when the support bars are removed from their intended positions of operation in which they extend transversely over the roof of the vehicle, they can be carried along without taking up space inside the vehicle.

SUMMARY OF THE INVENTION

Starting from the above type of roof rack, the object of the present invention is to improve the roof rack so that in its starting position, the roof rack can be arranged directly adjacent the roof of the vehicle and to also provide measures so that the support strips can nevertheless be easily swung into their positions of intended use, in particular, even for a roof which is curved upward.

According to the invention, the support strips can furthermore be displaced along respective vertical axes and are adapted to be locked in a selected lowered or upraised position.

The invention makes it possible to associate the support strips directly on or at least close to the roof top when they are not in use. This favors the vehicle aerodynamics, improves the appearance, and helps to avoid wind noises. On the other hand, due to the displaceability of the support strips along their vertical axes, the resulting distance between the strips and the roof of the vehicle can be sufficiently great to assure loading with luggage or other accessories as well as to enable the swinging of the support strips into their positions of use, even for strongly curved vehicle roofs.

Further features and advantages of the present invention are described with reference to embodiments of the invention which are explained below with reference to the drawings:

BRIEF DESCRIPTION OF THE DRAWINGS

FIG. 4 shows an alternate support foot for a support strip; and

FIG. 5 shows a detail of the invention in perspective.

DESCRIPTION OF THE PREFERRED EMBODIMENT

Figure 1:
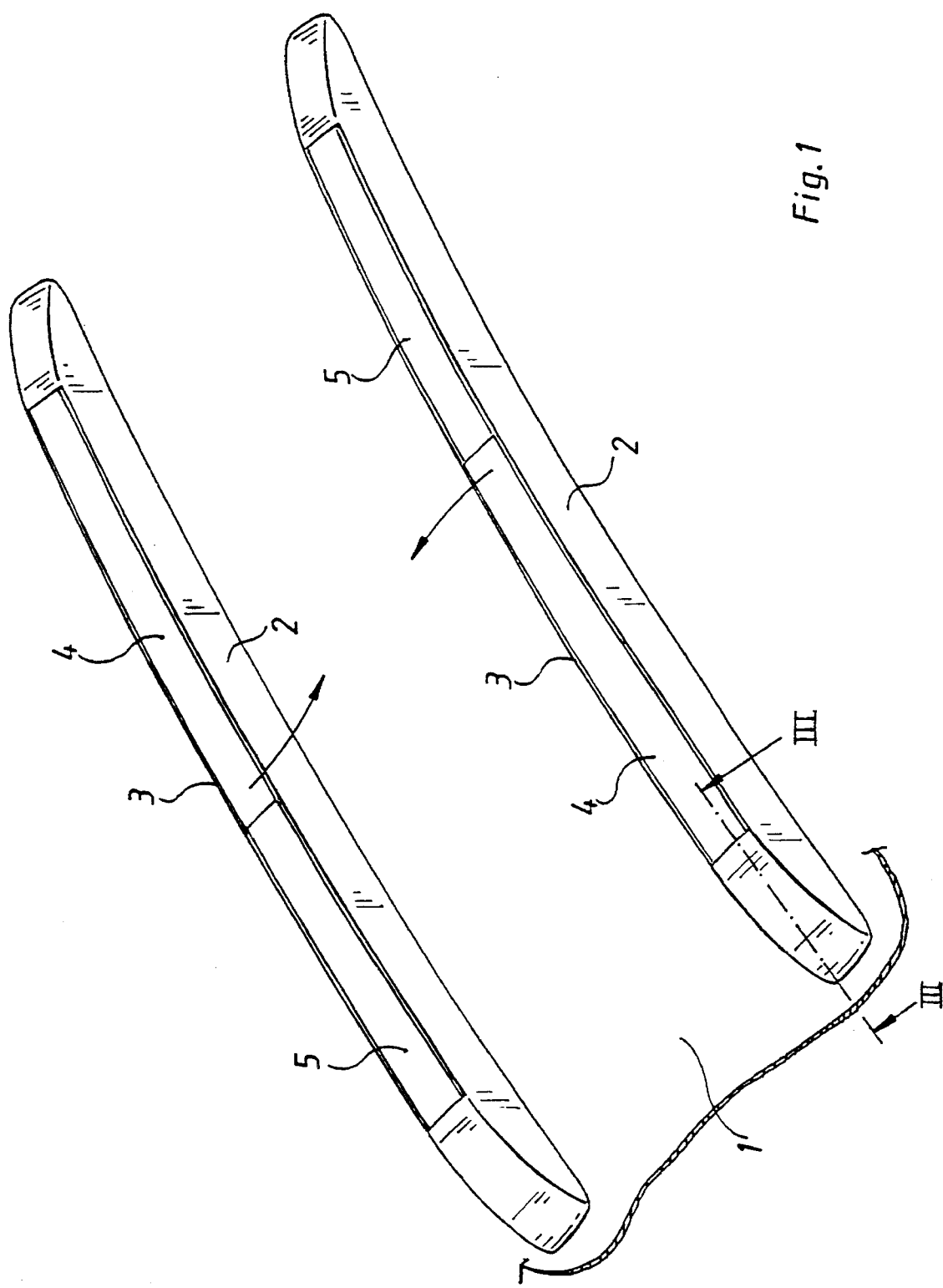
FIG. 1 shows a roof rack with a roof strip arrangement on a vehicle roof with the support strips in their positions of non-use.

FIG. 1 shows a fragment of a vehicle roof 1 on which two roof strips 2 are fastened. They extend approximately parallel to each other along the side edges of the surface of the roof. Each roof strip 2 has a recess 3 which is open in the upward direction and which extends practically over the entire length of the roof strip. Each recess 3 contains a support strip 4 having a length which is shorter than the length of the respective recess 3. The other region of each recess is covered by a covering 5.

In the embodiment of FIG. 1, the support strips 4 are arranged longitudinally offset from each other in their corresponding roof strips 2. Each strip 4 can be displaced to selected heights off the roof vertically at one axial end thereof, at a vertical axis 6 (FIG. 3), and can be swung around that axis in the direction indicated by an arrow. When required, the support strips 4 can thus be moved upward out of their recesses 3 in the respective roof strips 2 and their respective free ends can be swung toward the other roof strip 2 and fastened to it.

Figure 2:
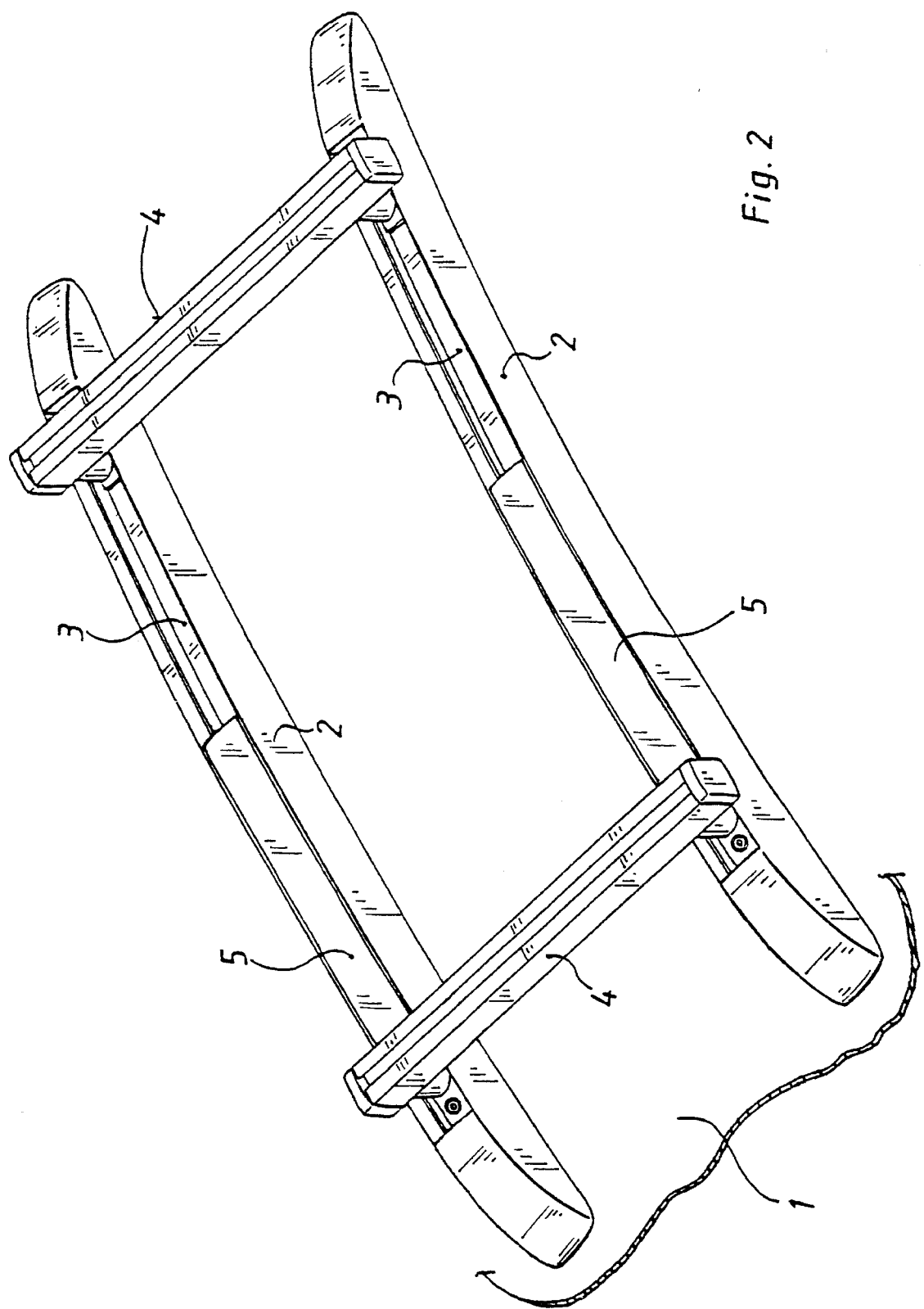
FIG. 2 shows a roof strip arrangement similar to that shown in FIG. 1, but with the support strips in their positions of use.

FIG. 2 shows substantially the same arrangement as FIG. 1, with the support strips 4 shown in their positions of use. Their end regions are fastened to the two roof strips 2. In FIG. 2, there is a relatively large vertical clearance between the vehicle roof 1 and the there uplifted support strips 4.

Figure 3:
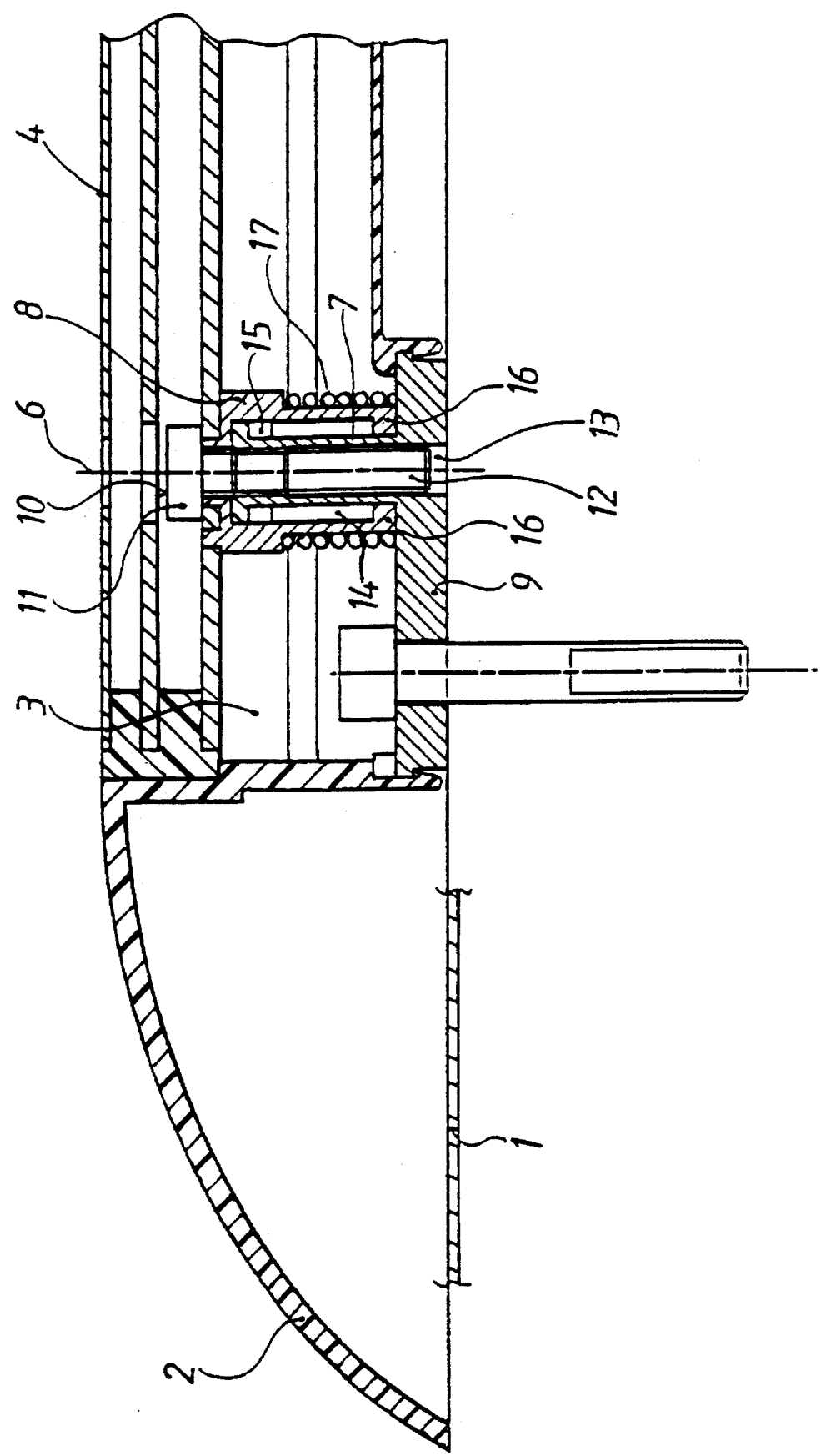
FIG. 3 is a cross section approximately along the line III—III of FIG. 1.

FIG. 3 shows a device for supporting a support strip 4 in both a vertically displaceable and a swingable manner. The vertical axis 6 includes a pin 7 and an axially and radially guided sleeve 8 around the pin. The pin 7, which can be fastened directly to the vehicle roof, or possibly also in a roof gutter, is shown seated here on a slide block 9. The block 9 in turn can be fastened, in a manner not shown in detail, to the car roof 1 or to a car beam construction beneath the roof. The pin 7 is fixed against rotation in the car roof 1 or the slide block 9. The sleeve 8 is seated, fixed against relative rotation, on the support strip 4 and is held there by a set screw 10. The screw head 11 rests against the support strip 4. The threaded shank 12 of the screw engages into a hole 13 in the pin 7. That hole is provided with an internal thread. The pin 7 (see also FIG. 5) has axially extending slide grooves 14 and, a short distance before its free end, the pin 7 has radially extending slide grooves 15.

Inwardly directed guide cams 16 of the sleeve 8 are received in a guided manner in the slide grooves 14, 15. The sleeve 8 has an annular flange, formed by a thickening on its top side, for enabling a coil compression spring 17 to rest against it. At its other end, the sleeve 8 rests against the slide block 9.

Figure 6A:
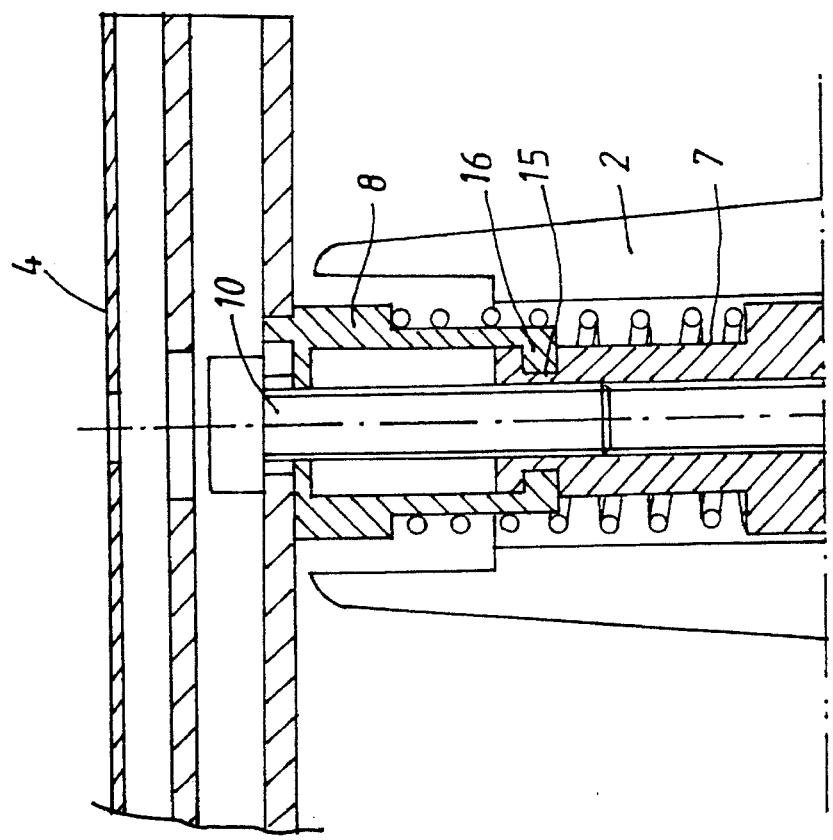
FIGS 6A and 6B are fragmentary views showing the attachment of a support strip at each of the roof strips.
Figure 6B:
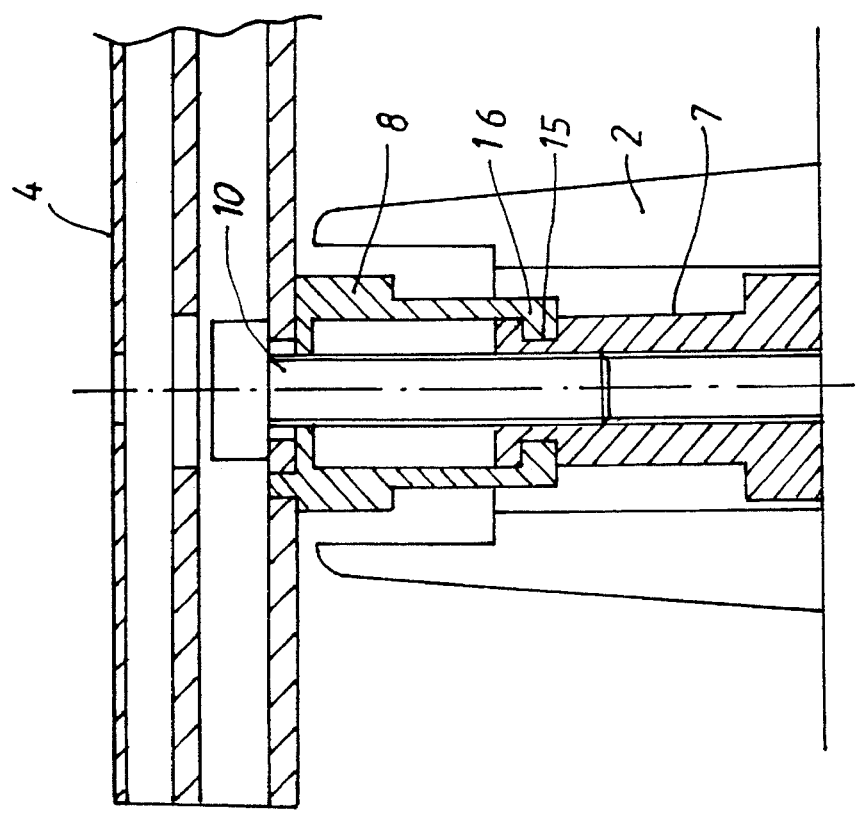
Figure 7:
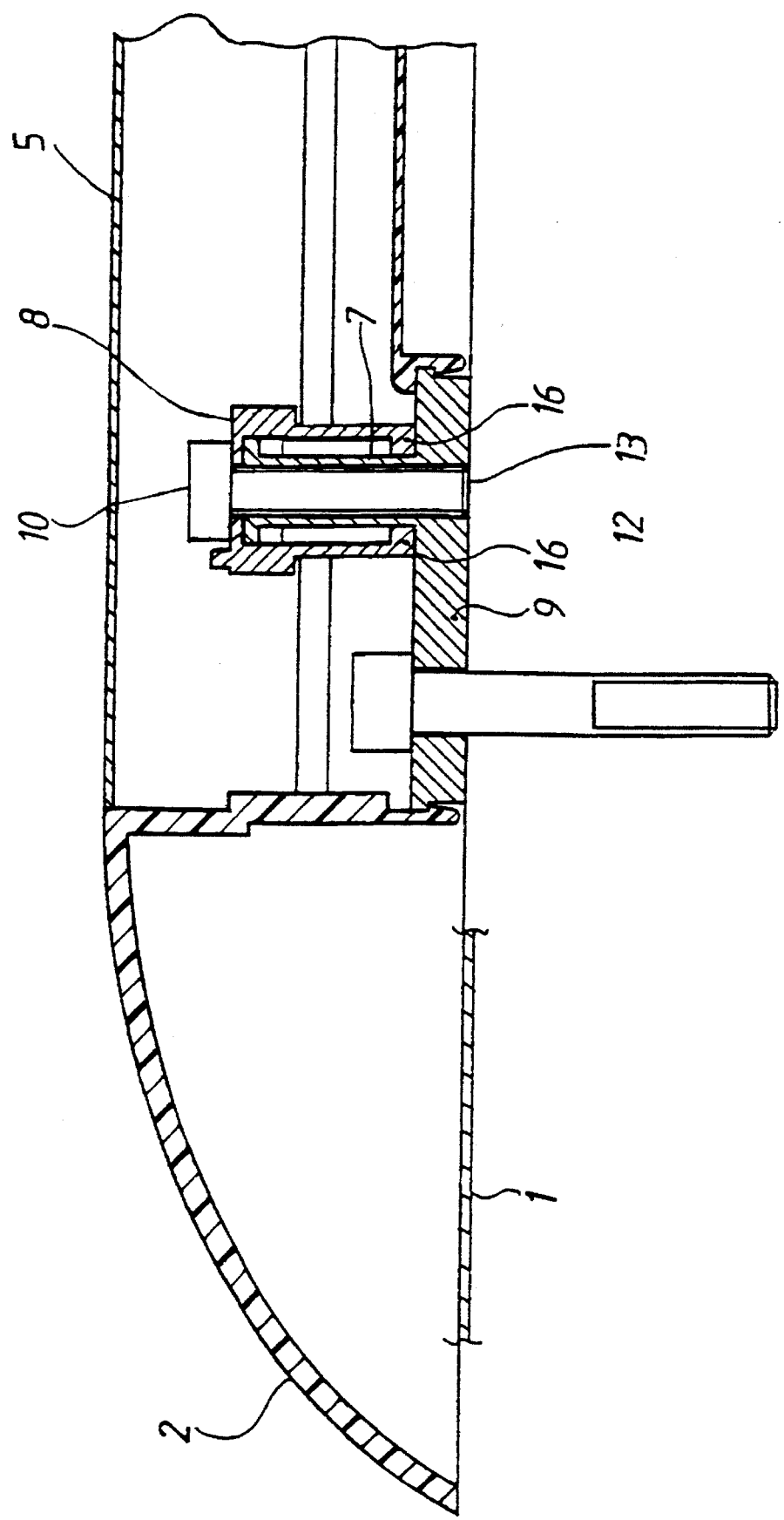
FIG. 7 is a fragmentary view of the means for attachment of the support strip at the roof strip prior to the attachment thereto.

In order to move a support strip 4 from a lowered position of non-use shown in FIG. 1 into an upraised, swung around position of use shown in FIG. 2, the set screw 10 is first loosened, and the support strip 4 is automatically pushed upward by the force exerted by the spring 17 on the sleeve 8 and thereby on the strip 4. In this connection, the guide cams 16 slide in the axial slide grooves 14 until they reach the flange stop 18. In this end position, the guide cams 16 are at the height of the radial slide grooves 15. This permits the support strip 4 to be swung through an angle of 90 degrees around the axis 6 so that the region of its free end comes to rest against the opposite roof strip 2. Referring to FIG. 7, at the other roof strip, there is an arrangement of a pin 7 and a sleeve 8 similar to FIG. 3, but in that arrangement at the other roof strip, the spring 17 can be dispensed with. By tightening the set screws 10 present on both sides, stable attachment of the support strips 4 is obtained, with the pins 7 resting on the roof, the sleeves 8 on the pins 7, and the support strip 4 on the sleeve 8. FIG. 6A shows one end of the support strip 4 as it swung through 90 degrees around the vertical axis 6 with the sleeve 8 moved upward on the pin 7 and with guide cam 16 positioned into radial slide groove 15, and FIG. 6B shows the opposite end of the support strip 4 as it is likewise connected to pin 7 and sleeve 8 at the other roof strip. The extent to which each screw 10 is tightened sets the height of the respective strip 4 off the roof, with the spring 17 pushing up until the screw bolts the strip. The support strips 4 are brought into their positions of non-use by the opposite sequence of the above steps.

The embodiment of FIG. 4 differs from that of FIG. 3 essentially merely by the fact that the support strip 4 is in this case arranged similar to a roof rail on support feet 19 at the opposite ends of the strip. Here, only one foot is shown. Otherwise, the same vertical displacement and swinging mechanism is provided in the embodiment in FIG. 4.

Both the roof strips 2 and the support feet 19 can be fastened by a clip mounting to the slide blocks 9.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A roof rack for the roof of a vehicle comprising:

a pair of laterally spaced apart, generally parallel roof strips extending longitudinally along the roof of the vehicle;

rails, each rail having a respective support strip thereon included as part of the roof strip, the support strip being supported to the respective roof strip at a vertical axis which enables the support strip to be rotated around the vertical axis for bringing an end of the support strip to and away from the other of the roof strips; means for selectively locking the support strip in the position along the respective roof strip or rotated to contact the other roof strip;

means at the vertical axis for enabling the support strip to be vertically displaceable along the vertical axis with reference to the roof strip, including means for locking the support strip selectively in a lowered vertical position and an upraised vertical position.

2. The roof rack of claim 1, wherein the means at the vertical axis comprises a loosenable adjustable mount for the support strip at the vertical axis, means for urging the support strip up from the roof strip, and means at the mount for limiting the extent to which the support strip may be moved up, the limiting means being adjustable for establishing the upraised position of the support strip.

3. The roof rack of claim 2, wherein the mount for limiting comprises a tightenable set screw which is engaged by the support strip and is settable for establishing the upper position for the support strip.

4. The roof rack of claim 2, wherein the urging means comprises a spring operating on the support strip for assisting in its movement.

5. The roof rack of claim 4, wherein the spring engages the support strip to raise the support strip to its upraised position.

6. The roof rack of claim 5, wherein the means at the vertical axis comprises a pin which is fastened to the roof of the vehicle; a sleeve guided axially on and radially around the pin, and the sleeve being fastened to the support strip above the roof;

the pin having an internally threaded hole therein, and the adjustable mount comprising a set screw which is screwed into the internally threaded hole of the pin; the set screw having ahead which rests against the corresponding support strip, and the support strip is guided axially of the set screw for establishing the upraised position of the support strip thereon.

7. The roof rack of claim 6, wherein the pin includes axially and radially extending slide grooves therein; the sleeve having a guide cam thereon guided in the slide grooves, for guiding the sleeve to move axially and for enabling the sleeve to rotate, enabling the support strip to swing.

8. The roof rack of claim 7, wherein the sleeve has an annular flange formed by thickening at its top; the spring comprises a coil compression spring having one end which presses against the flange, the spring having another end pressing toward the roof of the vehicle.

9. The roof rack of claim 7, wherein the pin is fastened directly on the roof of the vehicle.

10. The roof rack of claim 6, further comprising a slide block fastened to the roof of the vehicle, the pin being seated on the slide block, the slide block further serving to hold the roof strip which rests on the slide block.

11. The roof rack of claim 10, wherein each roof strip includes a recess at the top thereof which is opened toward the top for receiving the respective support strip therein.

12. The roof rack of claim 10, further comprising each roof strip including a respective support foot at each end thereof which rests on the slide block to support the roof strip over the slide block and the roof.

13. The roof rack of claim 2, wherein each roof strip includes a recess at the top thereof which is opened toward the top for receiving the respective support strip therein.

* * * * *